Nov. 2, 1943.  K. G. FRASER  2,333,166
PROPELLER HUB
Filed July 31, 1940 2 Sheets-Sheet 1
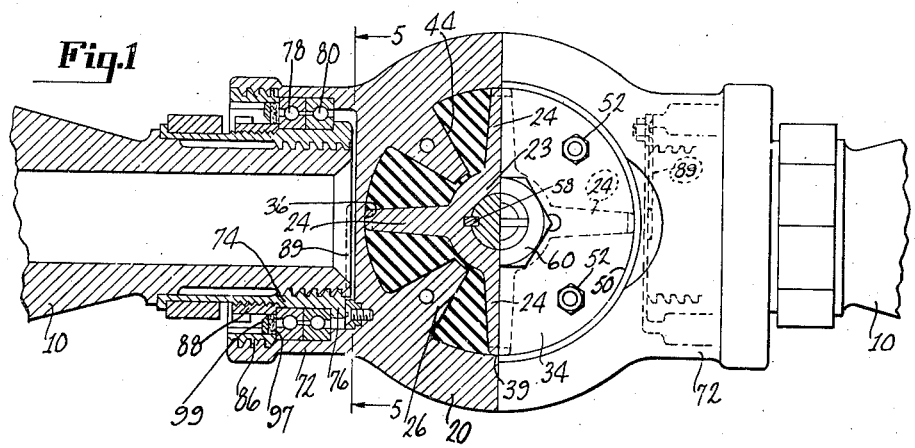
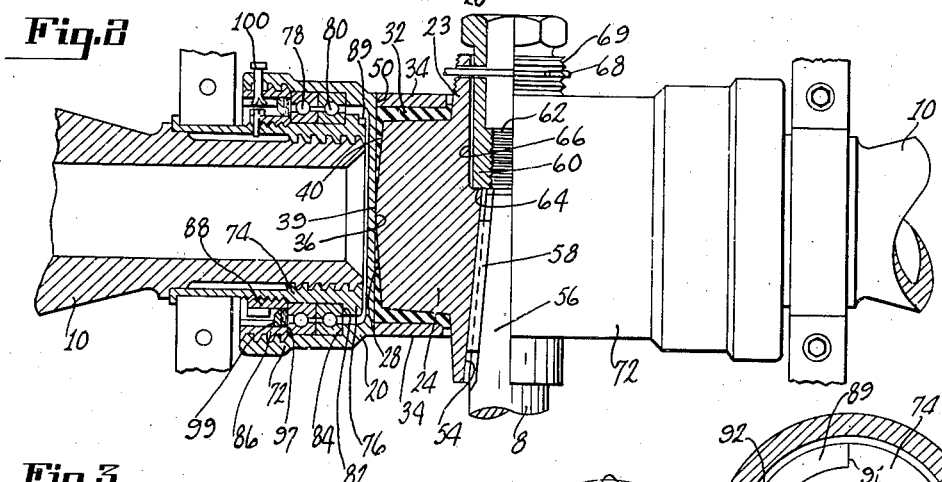
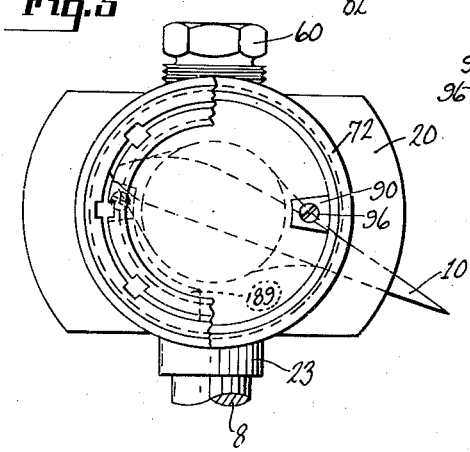
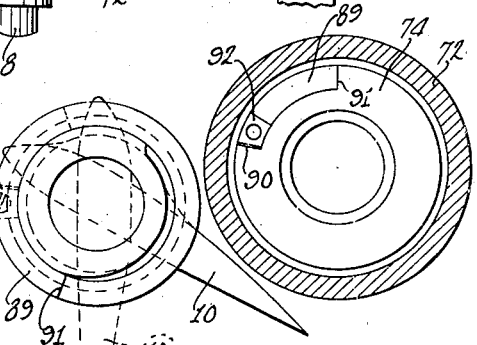
INVENTOR
KENNETH G. FRASER
By
ATTORNEY Nov. 2, 1943.  K. G. FRASER  2,333,166
PROPELLER HUB
Filed July 31, 1940   2 Sheets-Sheet 2
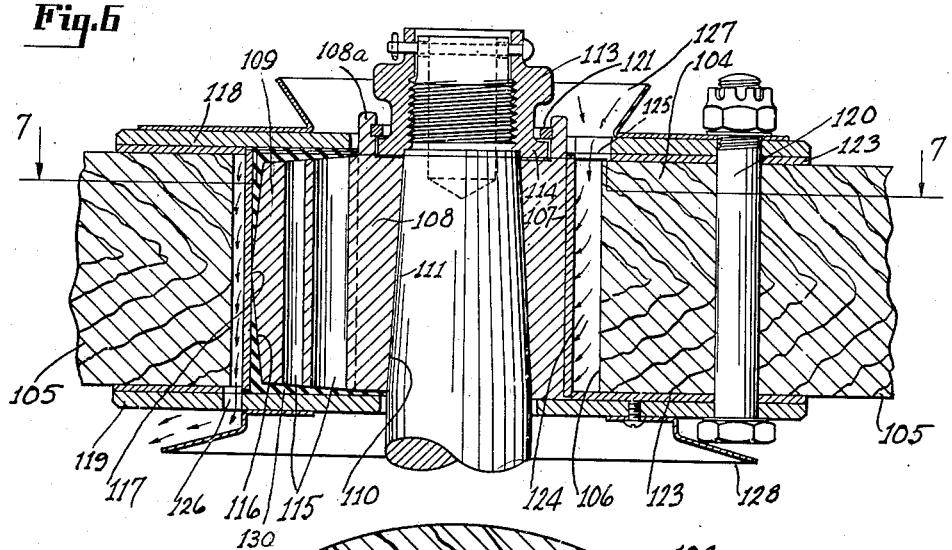
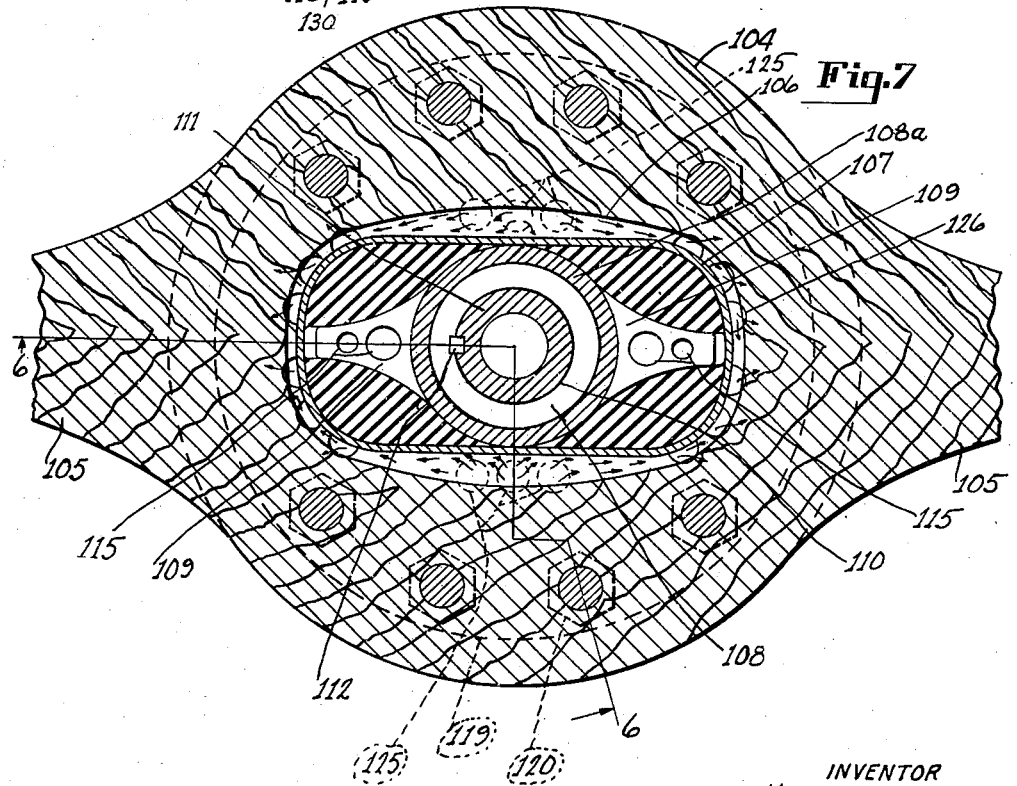
INVENTOR
KENNETH G. FRASER
BY
ATTORNEY Patented Nov. 2, 1943

2,333,166

UNITED STATES PATENT OFFICE 2,333,166

PROPELLER HUB

Kenneth G. Fraser, Dayton, Ohio

Application July 31, 1940, Serial No. 348,698

11 Claims. (Cl. 170—162)

This invention relates to a hub for a propeller for aircraft or the like, and is a continuation in part of the application filed by me September 15, 1936, Serial No. 100,828, on which application Patent No. 2,219,303 issued on October 29, 1940.

One object of the invention is to provide a simple efficient cushioned connection between the blades and the driving shaft of the propeller.

A further object of the invention is to provide means for yieldably connecting the blades with the driving shaft in such a manner that they may have tilting movement in any one of a plurality of planes passing through the axis of the shaft.

A further object of the invention is to provide a connection between the driving shaft and the blades which is resilient or shock absorbing in character and is positively centering, and which will permit the blades to run out of track when their thrust is unequal and thus establish counterbalancing centrifugal couples neutralizing the wobbling couple which would exist were the blades compelled to rotate in a plane at right angles to the driving shaft axis while their thrusts were unequal.

A further object of the invention is to provide a resilient driving connection between the blades and the driving shaft which will maintain the center of gravity of the propeller on the axis of the driving shaft and will damp the engine impulses.

A further object of the invention is to provide the aforesaid connections in the form of a hub comprising relatively movable members having opposed parts spaced one from the other, and yieldable elements interposed between each side of each part of one of said members and the adjacent parts of the other member.

Other objects of the invention may appear as the hub is described in detail.

In the accompanying drawings Fig. 1 is a front elevation of the hub showing the same and portions of the blades partly in section and partly in elevation; Fig. 2 is a side elevation of the hub showing the same and portions of the blades partly in section and partly in elevation; Fig. 3 is an end view looking at Fig. 2 from left to right with the propeller blades removed and the retaining wing or end plate broken away; Fig. 4 shows an end view of the inner portion of the blade in two different positions of operation; Fig. 5 is a sectional view taken on the line 5—5 of Fig. 1, looking in the direction of the arrows; Fig. 6 is a section taken on the line 6—6 of Fig. 7, showing a modified form of hub; and Fig. 7 is a section taken on the line 7—7 of Fig. 6.

In these drawings I have, for the purpose of illustration, shown two embodiments of my invention but it will be understood that the hub may take various forms without departing from the spirit of the invention. The embodiment illustrated in Figs. 1 to 5 was disclosed in the above mentioned application but the embodiment of Figs. 6 and 7 was not included in that application. In each embodiment shown the blades are connected with the propeller shaft by a hub comprising a driving member rigidly secured to the shaft and having two or more projecting parts spaced one from the other about the axis of the shaft. The blades are carried by a driven member mounted about the driving member for movement with relation thereto and having parts on the opposite sides of and opposed to each of the projecting parts of said driving member. Resilient elements are interposed between the adjacent surfaces of the opposed parts to provide a yieldable driving connection between the driving member and the driven member and to yieldably resist the tilting of the driven member with relation to the driving member. The driving and driven members are further provided with cooperating parts to center the driven member against radial displacement with respect to the axis of the driving member and to at the same time permit the tilting of the driven member with relation to the driving member.

In that embodiment of the invention illustrated in Figs. 1 to 5 the driving member comprises a central portion 23, substantially cylindrical in form, from which project a plurality of parts or vanes 24, preferably four in number and arranged in radii spaced equal distances about the axis of the central portion 23. The driving member may be connected with the propeller shaft 8 in any suitable manner. In the present instance, the central or hub portion of the driving member is provided with a longitudinal bore which is tapered for a portion of its length, as shown at 54, and is substantially cylindrical for the remaining portion of its length, as shown at 66. The shaft 8 has a tapered portion 56 fitting within the tapered portion of the bore of the driving member and rigidly secured therein, as by means of a key 58. The shaft 8 has a screw threaded portion 62 projecting beyond the tapered portion thereof and adapted to receive the internal threaded portion of an elongate nut or sleeve 60 which is inserted in the cylindrical portion 66 of the bore. A shoulder 64 is formed between the cylindrical and tapered portions of the bore in the central portion of the driving member and the nut 60, when screwed onto the threaded portion 62 of the shaft, contacts with the shoulder 64 and draws the tapered portion of the shaft into snug frictional contact with the tapered portion of the bore. The nut 60 may be held against rotation in any suitable manner, as by cotter pins 68 extending through the same and through a boss or extension of the central portion of the driving member, this boss being preferably threaded, as shown at 69, to permit the application thereto of a pulling device to remove the driving member from the shaft.

The driven member of the hub is shown in the form of a casing 20 which is preferably formed of light weight material, such as aluminum alloy, and is provided with blade sockets 72 to receive the inner ends or shanks of the blades 10. There may be any suitable number of these blade sockets but, in the present instance, two are shown. This casing is substantially cylindrical in form and is of an internal diameter approximately equal to the overall diameter of the driving member and it is provided with a plurality of inwardly extending parts or vanes 26 arranged in radii spaced equal distances about the axis of the driving member. When the driven member and driving member are assembled in their proper operative positions each vane 26 of the driven member is arranged between two adjacent vanes of the driving member and is preferably spaced equal distances therefrom. The vanes 26 are of such a length that they terminate adjacent to but out of contact with the cylindrical central portion of the driving member so as to permit the movement of the driven member with relation to the driving member. The ends of the casing 20 of the driven member are closed by annular end plates 34 arranged about but spaced from the projecting end portions of the central part 23 of the driving member and are removably secured to the casing, as by means of bolts 52 extending through the same and through the vanes 26 of the driving member.

The vanes 24 of the driving member preferably decrease in thickness toward their outer edges so as to impart thereto a flat tapered shape. These vanes are of a length slightly less than the internal length of the casing 20 so as to provide spaces 32 which will permit the tilting of the driven member with relation to the driving member without bringing the blades into contact with the end plates or closures 34. It is desirable that the driven member should be positively centered against radial displacement with relation to the axis of the driving member and for that purpose the driving and driven members may be provided with cooperating parts having metal to metal contact which will properly center the driven member without interfering with its tilting movements. In the present construction the vanes 24 of the driving member have their outer edges sloped from a central point toward the ends thereof, as shown at 28, and are provided at their points of greatest width with a small portion or contact point 36 contacting with the cylindrical inner surface 39 of the casing 20 at a point substantially in line with the longitudinal axes of the respective blades 10 which, in the present instance, are pivotally mounted in their sockets. This contact point of each vane 24 preferably has a partially spherical surface to permit free tilting movement of the casing of the driven member on the driving member. The sloping shape of the vanes provides spaces 40 between the vanes, on opposite sides of the contact points, and the wall of the casing and these spaces, together with the spaces 32, between the ends of the blades and the end closures 34, permit the driven member to tilt without metal to metal contact between the same and the driving member with the exception of the contact points 36.

Yieldable elements are interposed between the vanes 24 of the driving member and the vanes 26 of the driven member to establish a yieldable driving connection between those members and to yieldably resist the tilting of the driven member with relation to the driving member. Preferably these yieldable elements are in the form of inserts 22 of rubber having the desired degree of resiliency. Such an insert is arranged on each side of each vane of the driving member and is confined between the same and the adjacent surfaces of the driven vanes 26, preferably under pressure. In the present drawings rubber is also shown as filling the spaces 32 and 40 between the vanes 24 and the walls of the casing of the driven member but it is not necessary that these spaces should be so filled, nor is it necessary that there should be any rubber between the inner ends of the vanes 26 of the driven member and the central portion 23 of the driving member. The rubber inserts may be inserted in the spaces 44 between adjacent vanes of the driving and driven members in any suitable manner. If it is desired to establish a bond between the rubber and the metal parts of the driving and driven members this may be accomplished by inserting rubber, prior to final curing, in the respective spaces and vulcanizing the same therein. In carrying out this step of curing or vulcanizing the rubber in the hub the driving member and driven member are assembled in their proper relative positions and uncured rubber stock is inserted in the spaces between the opposed vanes. The driving member is held in proper position with respect to the casing of the driven member during vulcanization by means of fittings, not shown, which fit closely within the recesses 50, normally occupied by the casing closures, to confine the rubber during curing or vulcanization, each fitting having dowel pins which fit closely within the openings in the vanes of the driven member. In assembling the parts one of the fittings is first mounted at one end of the hub portion with the dowel pins in the corresponding openings in the vanes 26. Thereafter the assembled driving member and processing closure plate (not shown) are inserted in the hub casing and the other end closure (not shown) is then fitted and connected in place. The entire assembly is now placed in a live steam vulcanizing press and the curing effected.

However, the rubber inserts may be in the form of cured blocks or sections of rubber which may be inserted between the vanes of the driving and driven members while the latter are in their assembled positions. It is desirable that the volume of rubber in each space shall approximately equal the volume of each space and the contour of the blocks may be the same or slightly different from the parts defining such spaces, and the blocks are preferably of a length slightly greater than the length of the spaces between the vanes of the driven member. These blocks may be installed by placing the first four blocks in alternate spaces between the vanes of the driving member and driven member, assembled loosely, then anchoring either the driving member or the driven member and turning the other member to compress the inserted rubber blocks, thus increasing the width of the unfilled spaces so as to permit easy insertion of the four rubber blocks. The length of the rubber blocks being somewhat greater than the length of the vanes of the driven member the application and tightening down of the closure plates 34 will force the projecting end portions of the rubber blocks into the respective spaces and thus place each of the blocks under compression when the driven member is in its normal or idle position with relation the driving member. If it is desired to fill the spaces 32 and 40 with rubber this may be done by inserting strips or small sections of the rubber in those spaces.

The rubber inserts thus inserted between the vanes of the driving member and driven member provide a resilient driving connection between the two members of such a character that the impulses from the engine to the propeller will be cushioned and since the resilient means or rubber will yield to unequal thrust moments of the blade such moments will be counteracted by centrifugal moments of the blades and therefore these alternating moments will not reach the drive shaft and will not be transmitted to the airplane structure on which the propeller is mounted. Further, the positive centering of the driven member with relation to the driving member prevents the relative displacement of the center of gravity of the propeller with respect to the axis of the shaft and thus prevents vibration which would result from such displacement. The resilient driving connection between the driving member and the driven member damps the impulses of the non-constant torque engine and thereby materially reduces the magnitude of the alternating couples acting on the blades about their pivotal axes.

The propeller of Figs. 1 to 5 is of the variable pitch type as described in the above mentioned application and the blades are mounted in the blade sockets 72 for pivotal movement about their longitudinal axes. In order to minimize the frictional resistance to this pivotal movement of the blades anti-friction bearings are interposed between the shanks or foot ends of the blades and the sockets 72. In the arrangement shown, the inner or shank end of each blade is screw threaded and a threaded retaining sleeve 74 is mounted thereon and is provided with a transversely extending flange 76 which forms thereon an outwardly facing shoulder 82. The socket 72 is provided near its inner end with an outwardly facing shoulder 84, and ball bearings, in the present instance two, 78 and 80, are interposed between the retaining sleeve and the wall of the socket with the innermost bearing in contact with the shoulders 82 and 84. The bearings are retained in this space and under proper pressure by an annular nut 86 threaded in the outer portion of the socket 72 and an annular nut 88 threaded onto the retaining sleeve 74 on the outer side of the bearing. A sealing washer 97 of felt or like material is arranged in the bearing recess on the outer side of the bearings and is held in place by a metal washer 99 which is retained in operative position by contact with wrench lugs on the outer retaining nut 86, which is locked against movement by a cotter pin 100.

The retaining sleeve 74 on the inner end of each blade is provided with a segmental recess 89 forming at its ends shoulders 90 and 91, Fig. 5, and this recess receives between said shoulders a stop member 92 which is rigidly secured to the casing of the driven member at the base of the socket in a predetermined position with relation thereto and which serves, by contact with the shoulders 90 and 91 to limit the movement of the blade in either direction about its pivotal axis. When the blade is at the desired pitch angle for static position the shoulder 90 will contact one side of the stop 92, and when the blade is in the "feathering" position the shoulder 91 of the recess will contact with the opposite side of the stop. In the present instance, the stop 92 is shown in the form of a metallic block rigidly secured to the casing 20 by a screw 96.

In Figs. 6 and 7, I have shown a modified form of the invention which is designed primarily for use in propellers having non-adjustable blades and the particular construction illustrated is embodied in a wooden propeller in which the two blades and the hub portion are continuous and may be formed from a single piece of wood. Such a propeller has an enlarged intermediate portion 104 which constitutes the driven member of the hub, the blades 105 extend from the opposite sides of the driven member, and are broken away in the drawings. The driven member of the hub is provided with a longitudinal opening 106 extending through the same and here shown as approximately oval in form but it will be understood that the opening may take various shapes, as desired. Mounted within this opening is a metallic shell or liner 107 which is rigidly secured therein and is shaped to cooperate with the driving member, as will hereinafter appear. The driving member is shown as having a central substantially cylindrical portion 108 provided with oppositely extending parts or vanes 109 which are preferably integral with the central part 108. This central part of the driving member is provided with a tapered bore 110 to receive the tapered portion 111 of the driving shaft which is held against rotation therein by a key 112 and is drawn snugly into the tapered bore by a nut 113 screw threaded onto the smaller end of the shaft and having a flanged portion 114 contacting with the body or central portion of the driving member. The vanes 109 of the driving member have their surfaces converging outwardly and may, if desired, be provided with longitudinal openings 115 to reduce the weight thereof. Each vane has its outer edge sloped from a substantially central point to the ends of the vane, as shown at 116, thus providing a small contact point 117 which has pivotal contact with the metallic shell or liner 107, the contact of the two vanes with the liner serving to center the driven member with relation to the driving member, as above described. End plates or closures 118 and 119 are rigidly mounted on the respective sides of the driven member and are preferably in the form of annular plates which extend inwardly over the driving member and shell and are secured to the driven member by means of bolts 120. The central portion of the driving member projects forwardly beyond the vanes and through the opening in the end plate 118, and the inner edge of this end plate is spaced from the projecting portion of the driving member a distance sufficient to permit the driven member to tilt with relation to the driving member. This projecting portion of the driving member is here shown as an annular boss having in its inner side a recess to receive a locking ring 121 which overlaps the flange 114 of the nut. The end plate 119 extends inwardly close to the shaft 111 but is spaced therefrom on those sides adjacent the vanes so as to permit the driven member to tilt with relation to the driving member about a transverse axis at substantially right angles to the vanes. As shown more particularly in Fig. 6, the vanes 109 of the driving member extend lengthwise of the shell and have pivotal contact at their outer edges with the end walls of the shell, thus forming between the vanes and the adjacent portions of the shell spaces which are filled with yieldable material. Preferably this yieldable material is in the nature of inserts of rubber or rubber composition which is bonded to the vanes and the central portion of the driving member, as by vulcanization, the rubber being of a degree of resiliency which will offer the desired resistance to the relative movements of the driven and driving members. Preferably the rubber inserts are confined under pressure so as to provide a resilient driving connection between the driving member and the driven member and to yieldably resist the tilting movement of the driven member with relation to the driving member, substantially in the manner above described. The inserts being normally compressed tend to retain the vanes normally in their central positions with relation to the shell of the driven member. The vanes are of a length slightly less than the distance between the end plates, so as to avoid wear and friction, but the rubber inserts are preferably formed of a length slightly greater than that distance so that when the end plates are clamped firmly onto the driven member the rubber inserts will be compressed in the respective recesses.

The shell 107 may be of any suitable shape but is here shown as of oblong construction having substantially parallel side walls and curved end walls, the central portions of the end walls being curved about the axis of the driving member so as to permit the outer edges of the vanes to have a limited movement in contact therewith. The shell may be supported in the opening in the driven member in any suitable manner but it should be so connected with the driven member that it will transmit to that member the force which is transmitted to the shell by the vanes of the driving member, acting through the rubber inserts. As here shown, the shell is supported and connected with the driven member by connecting plates 123 which fit snugly about the end portions of the shell, which project slightly beyond the vanes of the driving member, and these connecting plates extend outwardly from the shell for substantially the full width of the end plates and are provided with apertures to receive the bolts 120. Thus the connecting plates are clamped firmly between the end plates and the body of the driven member and are rigidly connected to the body of the driven member by the bolts. This arrangement provides a very strong rigid connection by means of which the torsional strains are transmitted from the driving member through the shell and connecting plates to the driven member, and, further, in this arrangement the shell imparts relatively great strength to a wooden propeller and minimizes the danger of the same splitting or breaking. Under certain conditions of operation the relative movement of the driving and driven members may tend to create heat which, when excessive, may injure or destroy the rubber inserts and it is therefore preferable to provide some means for preventing excessive heating of the inserts. For this purpose the shell is spaced inwardly from the wall of the opening 106 in the body of the driven member and is supported in a fixed position therein by the connecting plates 123, which are preferably welded to the respective end portions of the shell, thus providing between the shell and the body of the driven member a space 124 which, in the present arrangement, extends entirely about the shell. The forward connecting member 123 and the end plate 118 are provided with a plurality of openings, as shown at 125, on opposite sides of the shell and adjacent the central portion of the driving member, and the rear connecting plate 123 and the driven member 119 are likewise provided with openings, as shown at 126, these latter openings being adjacent the ends of the shell. The openings 125 constitute air inlet openings through which air may enter the passageway 124, circulate about the shell and escape through the openings 126. When the airplane is in flight substantial quantities of air of high velocity will be forced through the passageway and about the shell and will maintain the same at such a temperature as to prevent the excessive heating of the rubber inserts. If desired, the propeller may be provided on its front surface with a funnel-shaped structure 127 to direct the air through the openings 125 and may be provided in its rear side with a deflector 128 which will deflect the escaping air outwardly away from the shaft.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. A propeller hub comprising a driving member, a driven member mounted for tilting movement with relation to said driving memer in any one of a plurality of planes passing through the axis of said hub, each member having parts arranged about the axis of said hub in opposed relation to the adjacent parts of the other member, and resilient means interposed between the adjacent parts of the two members to drivingly connect said members and to yieldably resist the tilting movement of said driven member, said driving and driven members having contacting parts to positively center said driven member against radial displacement with respect to the axis of said driving member, said contacting parts being relatively movable to permit the tilting of said driven member.

2. A propeller hub comprising a driving member, a driven member mounted for tilting movement with relation to said driving member in any one of a plurality of planes passing through the axis of said hub, each member having parts arranged about the axis of said hub in opposed relation to the adjacent parts of the other member, and resilient means interposed between the adjacent parts of the two members to drivingly connect said members and to yieldably resist the tilting movement of said driven member, each of said parts of said driving member having at its outer edge a point of pivotal contact with said driven member to positively center said driven member against radial displacement with relation to said driving member without interfering with the tilting of said driven member.

3. A propeller hub comprising a driving member and a driven member each having a plurality of substantially radial elements spaced apart circumferentially of the axis of said hub and arranged in opposed relation to the corresponding elements of the other member, said driven member and its elements being arranged with relation to said driving member and its elements for tilting movement with relation to said driving member in any one of a plurality of planes passing through the axis of rotation of said hub, and resilient means interposed between each element of each member and the two adjacent elements of the other member to drivingly connect said members and to yieldably resist the tilting movement of said driven member, said members having a metal to metal contact to center said driven member against radial displacement with relation to said driving member.

4. A propeller hub comprising a driving member having a plurality of substantially radial outwardly projecting vanes, a driven member movable with relation to said driving member and having a corresponding plurality of substantially radial inwardly projecting vanes, resilient means interposed between each vane of each member and the two adjacent vanes of the other member for yieldably and drivingly connecting said members, said driving and driven members having contacting parts to positively center said driven member against radial displacement with respect to the axis of the driving member, said parts being relatively movable to permit said driven member to tilt about a point coincident with the center of gravity of said propeller.

5. A propeller hub comprising a rotatable driving member and a driven member mounted about said driving member for rotation therewith and for movement with relation thereto and having its body portion spaced radially from the body portion of said driving member, said driven member having a plurality of inwardly extending vanes rigid with said spaced body portion and having their inner edges adjacent to but spaced from the body portion of said driving member, said driving member having a plurality of vanes rigid with the body portion thereof, extending outwardly between adjacent vanes of said driven member and having pivotal contact with said body portion of said driven member to permit the latter to move with relation to said driving member about an axis transverse to the axis of said driving member and to center said driven member with relation to the axis of said driving member, and blocks of resilient rubber confined under pressure between each vane of each member and the adjacent vanes of the other member, the radial dimension of each block being substantially equal to the radial distance between the body portions of said members.

6. In a propeller hub, a driving member, a driven member having an elongate opening to receive said driving member and mounted about said driving member for tilting movement with relation thereto in any one of a plurality of planes, a separate metallic shell mounted in said opening and having opposed parts in each end portion of said opening, said driving member having oppositely extending parts arranged between and spaced from the opposed parts of said shell at the respective ends of said opening, and resilient elements interposed between the respective sides of each of said parts of said driving member and the adjacent parts of said shell.

7. In a propeller hub, a driving member, a driven member having an elongate opening to receive said driving member and mounted about said driving member for tilting movement with relation thereto in any one of a plurality of planes, a separate metallic shell mounted in said opening, rigidly secured to said driven member and having opposed parts in each end portion of said opening, said driving member having oppositely extending parts arranged between and spaced from the opposed parts of said shell at the respective ends of said opening, and blocks of resilient rubber firmly secured to the respective sides of each of said parts of said driving member and confined between the same and the adjacent parts of said shell.

8. In a propeller hub, a driving member, a driven member having an elongate opening to receive said driving member and mounted about said driving member for tilting movement with relation thereto in any one of a plurality of planes extending through the axis of said driving member, a separate metallic shell rigidly mounted in said opening and having opposed parts in each end portion of said opening, said driving member having oppositely extending vanes arranged between opposed parts of said shell at the respective ends of said opening, resilient elements interposed between the respective sides of each of said vanes and the adjacent parts of said shell, connecting plates fitted about the ends of said shell, end plates overlapping said connecting plates and said vanes, and means for rigidly securing said end plates and said connecting plates to said driven member.

9. In a propeller hub, a driving member, a driven member having an elongate opening to receive said driving member and mounted about said driving member for tilting movement with relation thereto in any one of a plurality of planes, a separate metallic shell mounted in said opening and having opposed parts in each end portion of said opening, connecting members rigidly secured to said shell and extending outwardly therefrom on the respective sides of said driven member, end plates mounted on the respective sides of said driven member, extending inwardly over said vanes and said shell, means for rigidly connecting said end plates and said connecting member with said driven member, said driving member having oppositely extending parts arranged between and spaced from the opposed parts of said shell at the respective ends of said opening, and resilient elements interposed between the respective sides of each of said parts of said driving member and the adjacent part of said shell.

10. In a propeller hub, a driving member, a driven member having an elongate opening to receive said driving member and mounted about said driving member for tilting movement with relation thereto in any one of a plurality of planes, said driven member having opposed parts adjacent each end of said opening and said driving member having oppositely extending parts arranged between and spaced from the opposed parts of said driven member at the respective ends of said opening, resilient elements interposed between the respective sides of each of said parts of said driving member and the adjacent parts of said driven member, and means for circulating a cooling medium through said hub in cooling relation to the relatively movable parts thereof.

11. In a propeller hub, a driving member, a driven member having an elongate opening to receive said driving member and mounted about said driving member for tilting movement with relation thereto in any one of a plurality of planes, a metallic shell mounted in said opening and having opposed parts in each end portion of said opening, means for supporting said shell in spaced relation to said driven member to provide a passageway between the same and said driven member, said driving member having oppositely extending parts arranged between and spaced from the opposed parts of said shell at the respective ends of said opening, resilient elements interposed between the respective sides of each of said parts of said driving member and the adjacent parts of said shell, end plates rigidly mounted on the respective sides of said driven member and having respectively air inlet and air outlet openings communicating with said passageway.

KENNETH G. FRASER.